(12) United States Patent
Sibbett

(10) Patent No.: US 7,686,969 B2
(45) Date of Patent: Mar. 30, 2010

(54) METHOD FOR MANUFACTURING DOOR MOLD AND DOOR PRODUCED USING THE SAME

(75) Inventor: Peter Sibbett, NE Tacoma, WA (US)

(73) Assignee: Capstoneengineering, Ltd., Kyoung Nam (KR)

( * ) Notice: Subject to any disclaimer, the term of this patent is extended or adjusted under 35 U.S.C. 154(b) by 297 days.

(21) Appl. No.: 11/753,860

(22) Filed: May 25, 2007

(65) Prior Publication Data

US 2008/0006760 A1    Jan. 10, 2008

Related U.S. Application Data

(63) Continuation-in-part of application No. 10/686,593, filed on Oct. 17, 2003, now abandoned.

(30) Foreign Application Priority Data

May 13, 2003    (KR) .............................. 20030030190

(51) Int. Cl.
*B44C 1/22* (2006.01)

(52) U.S. Cl. ....................................................... 216/29

(58) Field of Classification Search ................... 216/28, 216/29, 41; 52/313
See application file for complete search history.

(56) References Cited

U.S. PATENT DOCUMENTS 7,338,612 B2 *    3/2008    Luetgert et al. ................ 216/29

* cited by examiner

*Primary Examiner*—Roberts Culbert
(74) *Attorney, Agent, or Firm*—Perkins Coie LLP

(57) ABSTRACT

The present invention relates to a method for manufacturing a door mold and a door produced using a mold that is manufactured by the method. The method for manufacturing the door mold according to the present invention comprises a masking/sanding process of masking a non-etching area except an etching area of the mold and then finishing the etching area with sand to transfer a pattern on the etching area; a pattern forming process for forming the pattern on the etching area of the mold; a mesh forming process of forming a mesh on the etching area of the mold; a polishing process of performing polishing treatment by spraying glass beads on the etching area such that the degree of polish of the etching area can be uniformly maintained; and a mask removal/inspection process of performing anticorrosive treatment on the surface of the mold. Further, there is provided a door produced using the mold that is manufactured by the method.

12 Claims, 1 Drawing Sheet

METHOD FOR MANUFACTURING DOOR MOLD AND DOOR PRODUCED USING THE SAME

CROSS REFERENCE TO RELATED APPLICATIONS

This application is a continuation-in-part of applicant's U.S. non-provisional application Ser. No. 10/686,593 (Abandoned), entitled "Method of manufacturing door mold and door produced using the same," the contents of which are incorporated herein by reference. This application claims priority to Korean application 2003-0030190 entitled "Method for manufacturing door mold and door produced using the same," the contents of which are incorporated herein by reference.

BACKGROUND

Traditionally a door has been made out of wood. While aesthetically pleasing, wood doors are expensive, more prone to warping, dimensional variation and weathering. The next evolution in alternatives to wood doors was a steel door with an insulating core. Although less expensive than wood doors, steel doors tend to dent, rust and feel cold to the touch. Furthermore a steel door does not have the warmth and visual appeal of a wood door. For some years, fiberglass doors have appeared in the construction market and provide distinct advantages over the wood door and the steel door. The fiberglass doors are usually made by sandwiching two compression-molded fiberglass door skins with an insulating foam core. Because the fiberglass skins are molded, it became possible to express wood grain patterns on the fiberglass skins to mimic wood grain textures. Hence, the fiberglass doors had an aesthetically pleasing quality of wood doors and better insulation without the negative quality of wood doors such as high cost, cracking, splitting and weathering. However, the existing attempts to truly express a wood grain pattern and texture on a fiberglass door has been difficult or expensive.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above described problems have been reduced or eliminated, while other embodiments are directed to other improvements.

An object of the present invention is to provide a method for manufacturing a door mold by which the grain or texture of wood can be almost completely expressed on a door and the door mold can also be mass-produced, and a door produced using the method.

According to an aspect of the present invention for achieving the object, there is provided a method for manufacturing a door mold which comprises a masking/sanding process of masking a non-etching area except an etching area of the mold and then finishing the etching area with sand to transfer a pattern on the etching area; a pattern forming process which comprises a pattern transfer step of transferring a film printed with the pattern onto the etching area of the mold, a correction step of correcting connection and non-matched portions of the pattern, a precise masking step of precisely masking the non-etching area of the mold for its protection, an etching step of performing an etching operation with chemicals selected in accordance with a mold material and the pattern, and a cleaning step of cleaning the etching area of the mold with an alkaline solution and/or a sanding step of finishing the etching area with sand; a mesh forming process which comprises a mesh transfer step of transferring a mesh onto the etching area using a spraying method after the pattern forming process has been completed, an etching step of performing an etching operation with chemicals selected in accordance with the mold material and the mesh, and a sanding step of finishing the etching area with sand; a polishing process of performing polishing treatment by spraying glass beads on the etching area such that the degree of polish of the etching area can be uniformly maintained; and a mask removal/inspection process of removing a mask material from the non-etching area of the mold and then performing anticorrosive treatment on the surface of the mold after the polishing process has been completed. Further, there is also provided a door produced using the mold that is manufactured by the method.

Preferably, the pattern forming process is repeatedly performed at least twice.

More preferably, the mesh forming process is repeatedly performed at least twice.

Further, it is preferred that etching depths in the mold during the pattern forming processes may be different from one another such that the depths of the pattern formed on a surface of the door can be different.

With the method for manufacturing the door mold so constructed according to the present invention, the grain or texture of wood can be almost completely expressed on the door and the door mold can also be mass produced.

BRIEF DESCRIPTION OF THE DRAWING

Embodiments of the inventions are illustrated in the figures. However, the figures are illustrative rather than limiting; they provide examples of the inventions.

DETAILED DESCRIPTION

Figure 1:
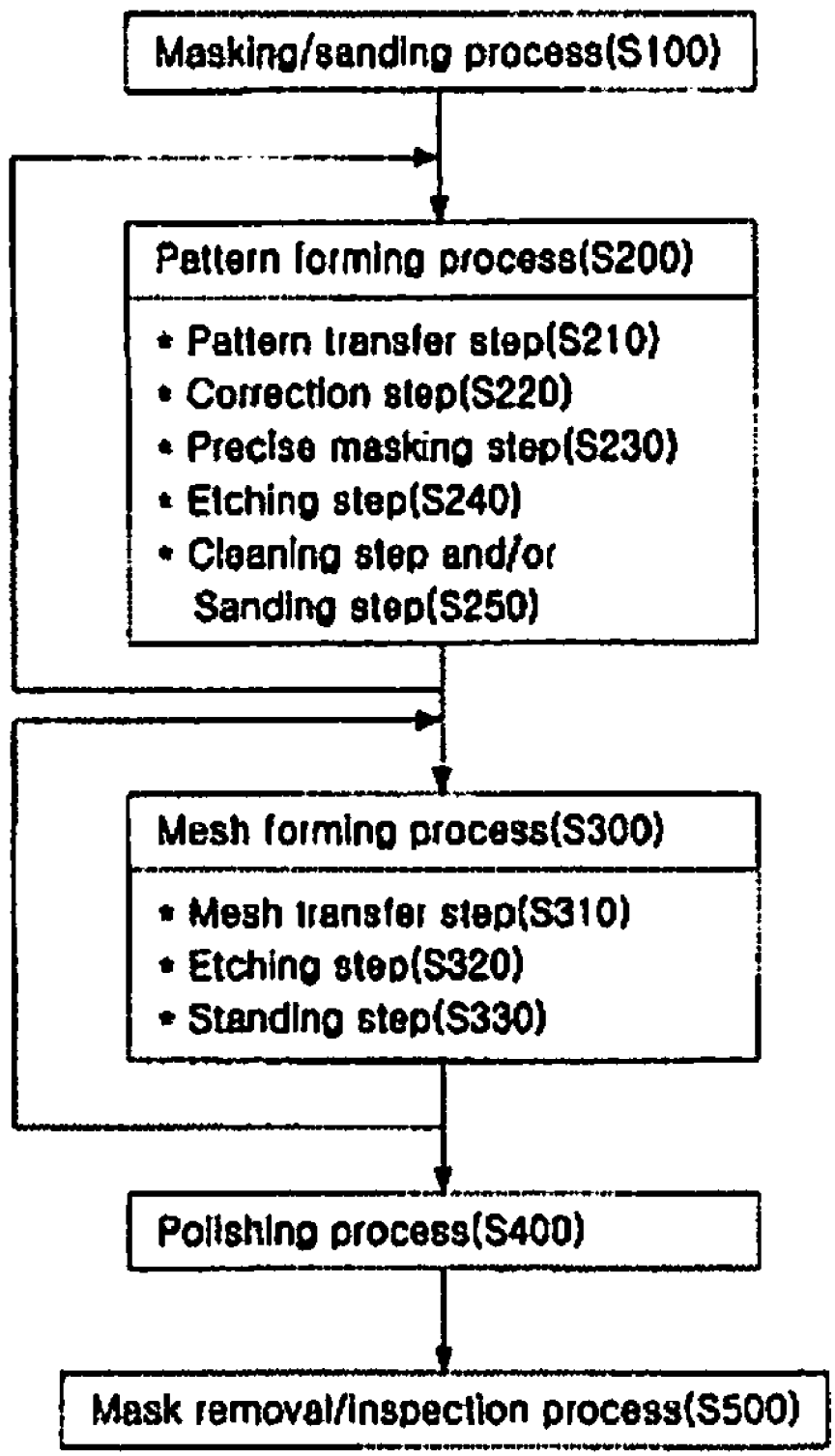
FIG. 1 illustrates a process of manufacturing a door mold according to the present invention.

In the following description, several specific details are presented to provide a thorough understanding of embodiments of the invention. One skilled in the relevant art will recognize, however, that the invention can be practiced without one or more of the specific details, or in combination with other components, etc. In other instances, well known implementations or operations are not shown or described in detail to avoid obscuring aspects of various embodiments of the invention.

FIG. 1 illustrates a method for manufacturing a door mold according to the present invention. In the example of FIG. 1, the method for manufacturing the door mold generally comprises a masking/sanding process S100, a pattern forming process S200 for causing a pattern to be formed on an etching area of the mold, a mesh forming process S300 for scattering an acid resistant liquid to form a mesh on the etching area of the mold, a polishing process S400, and a final mask removal/inspection process S500. The pattern and mesh forming processes may be repeatedly performed twice or more. It is apparent that the number of repetition of the processes can be somewhat increased depending on the desired degree of expression of the grain or texture of wood.

When a mold is prepared, a state of the mold is first checked by confirming whether a welding process should be performed while manufacturing the mold, what is the material of the mold, and to what extent the etching process should be performed. Then, a preparation step for removing foreign substances from a surface of the mold and cleaning the surface of the mold is performed.

Thereafter, in order to manufacture the door mold, the masking/sanding process S100 for masking a non-etching area except the etching area of with a tape and cleaning the etching area of the mold and then and sanding the mold surface to transfer the predetermined pattern onto the etching area is performed.

After the above process has been completed, the pattern forming process S200 for causing the pattern to be formed on the etching area of the mold is now performed. In such a case, to transfer a desired pattern such as the grain of wood onto the mold, a film printed with a relevant pattern is first cut out in accordance with a shape of the mold so that the pattern can be carefully transferred onto the etching area of the mold (S210). After the relevant pattern has been transferred, connection and non-matched portions of the pattern are corrected by using acid resistant ink. At this time, the correction should be made so carefully that the connection and flow of pattern are smoothly maintained and the correction ink is not smeared on an area on which the pattern is not formed (S220). Then, the non-etching area such as edge portions of the mold is precisely masked so that the non-etching area of the mold can be fully protected (S230).

After the etching and non-etching areas of the mold are carefully divided as such, acid chemicals suitable for the mold material and the pattern are selected so that the etching operation can be performed. At this time, the etching operation should be performed so carefully that an etching depth in the entire etching area will be uniform by always checking the etching depth using a depth gauge (S240). Thus, the etching area of the mold except the non-etching area is etched with chemicals and is then lowered to a certain depth after a given time period. As a result, the non-etching area of the mold corresponds to a shape of the grain of wood, which is deeply etched from a surface of a finished door by a constant depth.

Then, a cleaning operation for clearly removing the foreign substances remaining on the mold surface by cleaning the acid chemicals remaining on the etching area of the mold with an alkaline solution and removing the masking tape and/or a sanding operation for finishing the etching area of the mold with sand so as to completely remove the foreign substances are performed (S250).

The pattern forming process S200 of the present invention should be repeatedly performed at least twice. At this time, it is most important that the etching depth in the subsequent etching step of the pattern forming process be different from that in the previous etching step of the pattern forming process. To this end, the time periods in the etching steps should be accurately controlled and the etching operation should also be performed while always confirming whether the entire etching area of the mold can be uniformly etched at the constant depth using the depth gauge.

Therefore, the pattern forming process S200 is performed at least twice as described above. The pattern is formed to have a total etching depth corresponding to the sum of the etching depth in the previous pattern forming process and the etching depth in the subsequent pattern forming process. As a result, the finished door is produced in such a manner that the deepest pattern thereof corresponds to the non-etching area of the mold that has not been etched during the previous pattern forming process and the next deeper pattern thereof corresponds to the non-etching area of the mold that has not been etched during the subsequent pattern forming process. Therefore, since the etching depth difference in the pattern is produced as such, the grain of wood can be almost completely expressed on the finished door.

Accordingly, it is apparent that more natural curly grain can be expressed by varying the depth of the curly grain. Consequently, it is also apparent in the present invention that the number of repetition for the pattern forming process S200 can be somewhat increased depending on the degree of expression for the grain of wood.

After the pattern forming process S200 has been completed, the mesh forming process S300 will transfer a mesh onto the entire etching area of the mold by scattering an acid resistant liquid over the surface of the mold material.

According to the mesh forming process S300, the mesh is first transferred onto the entire etching area of the mold using the spraying method (S310) e.g. spraying acid resistant matter which scatters over the etching area of the mold. Herein, a mesh is materially applied in a pattern understood to be any mesh like pattern such as the mesh like pattern inherently arising when the acid resistant matter is sprayed or scattered over the etching area of the mold. It is understood that a person having ordinary skill in the art could transfer the mesh by other methods than spraying such that the acid resistant matter scatters over the mold material forming a mesh pattern. The etching area of the mold is then etched with the chemicals selected in accordance with the mold material and the mesh while controlling the time period such that the etching depth in this etching operation can be relatively smaller than that in the pattern forming process (S320). The mold material not covered by the acid resistant matter is exposed to the chemicals and the acid resistant matter prevents the mold material covered by the acid resistant matter from being exposed to the chemicals. After the etching operation, the sanding operation for finishing the etching area of the mold with sand will be immediately performed (S330).

Furthermore, the mesh forming process S300 of the present invention is repeatedly performed at least twice thereby scattering acid resistant matter over the mold material and etching the mold material. At this time, it is also most important that the etching depth in the subsequent etching step of the mesh forming process be different from that in the previous etching step of the mesh forming process. As a result, since the etching depth difference in the mesh is produced on an entire surface of the finished door, the texture of wood can be almost completely expressed on the finished door. According to the present invention, it is preferred that the etching depth in mesh forming process be within a range of 0.02 to 0.05 mm in consideration of the etching depth in the pattern forming process. Thus, it can be seen that the natural texture of wood can be expressed very well on the surface of the finished door such that it is well in harmony with the pattern.

By way of example, the depth of the first forming mesh process could varied to be shallower than the second mesh forming process to acquire more than one depth in the etching of the door. In this example, the door would more easily have paint applied due to the varied depths. This and other benefits make the mesh forming process advantageous over existing methods of manufacture in the art.

Accordingly, it is apparent that more natural texture of wood can be expressed by varying the etching depth formed by the mesh pattern. Consequently, it is also apparent in the present invention that the number of repetitions for the mesh forming process can be somewhat increased depending on the degree of expression for the texture of wood.

In addition, after the mesh forming process has been completed, the polishing process S400 for polishing the mold surface to a certain extent by spraying solid particles with high-pressure air onto the surface so as to allow the mold surface to be uniformly polished will be performed.

Generally, the degree of polish may vary according to a ratio of the solid panicles used in the polishing process. In such a case, glass beads and sand are widely used as the solid particle. At this time, a case where only 100 vol % of glass beads in the ratio (by volume) of the two solid particles is used is referred to as "glossy", whereas the other cases are referred to as "matte".

In the meantime, the ratio of the solid particles can be changed suitably according to the degree of polish. It can be seen from the present invention that the natural beauty and the texture of wood can be optimally expressed on the surface of the finished door when the door surface is polished with a mixture of the solid particles consisting of 70 to 99 vol % of the glass beads and 1 to 30 vol % of sand.

After the polishing process S400 has been completed, the mask removal/inspection process S500 for completely removing the masking tape from the non-etching area of the mold and performing anticorrosive treatment for the entire mold surface is performed as a final finish process in the method for manufacturing the door mold according to the present invention.

Meanwhile, a door can be manufactured using the door mold manufactured as such. At this time, the door is made from a thermosetting resin such as polyester SMC (sheet molding compound).

The door so manufactured can be mass produced using the mold, and both the natural grain of wood and the superior texture of wood can be also expressed on the surface of the finished door. As a result, the door manufactured using the door mold according to the present invention allows a purchase desire of a consumer to be increased and the increase in profit due to the quality enhancement of products is also expected.

The present invention has been described in connection with the method for manufacturing the door mold wherein the pattern forming processes of forming the predetermined pattern on the mold surface are performed several times and the etching depths in the pattern and mesh forming processes are different from one another, and the door produced using the method. However, it is apparent that the technical spirit of the present invention can be applied to surfaces of wardrobes and tables or to furniture and construction materials substituting for the material wood.

Furthermore, the grain or texture of wood can be almost completely expressed on the door by varying the depths of the patterns formed on the surface of the door. Therefore, the effect of import substitution of the expensive material wood is expected.

Advantageously, the purchase desire of the consumer can be increased and the increase in profit due to the quality enhancement of products is also expected. Furthermore, since the products can be mass produced by using the mold, their productivity can be improved.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, and equivalents as fall within the true spirit and scope of the present invention.

I claim:

1. A method for manufacturing a door mold, comprising:
   masking a non-etching area leaving a first etching area of a mold unmasked;
   sanding the mold;
   transferring a film printed with a pattern on to the first etching area;
   correcting the pattern for connection and non-matched portions;
   masking the non-etching area of the mold with a mask material;
   first etching a mold material with chemicals selected in accordance with the mold and the pattern;
   cleaning the first etching area of the mold using an alkaline solution;
   finishing the first etching area with sand;
   transferring an acid resistant material onto the first etching area by scattering the acid resistant material to form a mesh pattern;
   second etching the mold material with chemicals selected in accordance with the mold material and the acid resistant material, the second etching forming a second etch area;
   finishing the second etching area with sand;
   performing a polishing treatment by spraying glass beads on the second etching area such that the degree of polish of the second etching is uniform;
   removing the mask material from the non-etching area of the mold; and
   performing anticorrosive treatment on the surface of the mold.

2. The method as claimed in claim 1, wherein the first etching has a first depth, the second etching has a second depth and the first depth is different from the second depth.

3. The method as claimed in claim 1, wherein the following three steps as a sequence are repeated more than once:
   transferring an acid resistant material onto the first etching area by scattering the acid resistant material to form a mesh pattern;
   second etching the mold material with chemicals selected in accordance with the mold material and the acid resistant material, the second etching forming a second etch area; and
   finishing the second etching area with sand.

4. The method as claimed in claim 3, wherein the second etching depth in the mold is within a range of 0.02 to 0.05 mm.

5. The method as claimed in claim 1, wherein 70 to 99 vol % of the glass beads are used in the polishing process.

6. A method for manufacturing a door mold, comprising:
   transferring a film printed with a pattern on to a first etching area;
   masking a non-etching area of the mold with a mask material;
   first etching a mold material with chemicals selected in accordance with the mold material and the mesh;
   cleaning the first etching area of the mold;
   scattering an acid resistant material on the mold to form a mesh pattern;
   second etching the mold material with chemicals selected in accordance with the mold material and the mesh, the second etching forming a second etching area;
   finishing the second etching area with sand; and
   removing the mask material from the non-etching area of the mold.

7. The method for manufacturing a door mold of claim 6 wherein the film is corrected for connection and non-matching portions after being transferred on to the first etching area.

8. The method as claimed in claim 6, wherein the following three steps as a sequence are repeated more than once:
   transferring an acid resistant material onto the first etching area by scattering the acid resistant material to form a mesh pattern;
   second etching the mold material with chemicals selected in accordance with the mold material and the mesh, the second etching forming the second etching area; and
   finishing the second etching area with sand.

9. The method as claimed in claim 6, wherein the first etching has a first depth in the mold, the second etching has a second depth in the mold and the first and second depths are different.

10. The method as claimed in claim 6, wherein the second etching depth in the mold is within a range of 0.02 to 0.05 mm.

11. The method as claimed in claim 6, wherein 70 to 99 vol % of the glass beads are used in the polishing process.

12. The method for manufacturing a door mold of claim 6 wherein:
   cleaning the etching area of the mold is accomplished using an alkaline solution.

* * * * *